United States Patent [19]
Ohtake et al.

[11] Patent Number: 6,060,805
[45] Date of Patent: May 9, 2000

[54] CANNED MOTOR

[75] Inventors: Koichi Ohtake, Yokohama; Tetsuya Hiramatsu, Machida; Hiroyuki Kato, Yokohama; Shuichiro Honda, Kawasaki, all of Japan

[73] Assignee: Ebara Corporation, Tokyo, Japan

[21] Appl. No.: 08/897,678

[22] Filed: Jul. 21, 1997

[30] Foreign Application Priority Data

Aug. 12, 1996 [JP] Japan .................................. 8-229377

[51] Int. Cl.⁷ ...................................................... H02K 5/12
[52] U.S. Cl. .......................... 310/87; 310/261; 310/264; 310/265
[58] Field of Search .................................. 310/88, 89, 91, 310/261, 264, 265, 271; 29/596, 597, 598

[56] References Cited

U.S. PATENT DOCUMENTS 3,192,861  7/1965  Haegh ........................................ 310/87

FOREIGN PATENT DOCUMENTS 6-31356   4/1994   Japan .

*Primary Examiner*—Nestor Ramirez
*Assistant Examiner*—Tran N Nguyen
*Attorney, Agent, or Firm*—Oblon, Spivak, McClelland, Maier & Neustadt, P.C.

[57] ABSTRACT

A canned motor includes a rotor having a rotor core and a rotor can covering an outer circumferential surface of the rotor core, and a stator fixedly disposed around the rotor with a radial gap defined therebetween and having a stator core and a stator can covering an inner circumferential surface of the stator core. The rotor core has at least one groove defined in an outer circumferential surface thereof and extending longitudinally thereof. The rotor can has a portion pressed into the groove and held in intimate contact fully with the outer circumferential surface of the rotor core.

4 Claims, 2 Drawing Sheets

CANNED MOTOR

BACKGROUND OF THE INVENTION

1. Field of the Invention

The present invention relates to a canned motor which can be assembled in a casing together with a pump that can be operated by the canned motor, and more particularly to a canned motor rotatable at a high speed of at least 10000 rpm, for example, in a high-temperature, high-pressure atmosphere, e.g., at a temperature of 400° C. or higher under a pressure of 200 kgf/cm² or higher.

2. Description of the Prior Art

One conventional canned motor having a pressure-resistant structure is generally constructed as shown in FIG. 1 of the accompanying drawings.

As shown in FIG. 1, the canned motor primarily comprises a rotor 11 mounted on a rotatable shaft 10 and a stator 13 fixedly disposed around the rotor 11 with a radial gap defined between the rotor 11 and the stator 13. A pump impeller- (not shown) is mounted on an axial extension of the shaft 10, which is rotatably supported by magnetic bearings.

The rotor 11 comprises a rotor core 21 mounted on the shaft 10 and having an outer circumferential surface covered with a rotor can 25. The stator 13 comprises a stator core 14 and windings extending through the stator core 14 and having coil ends 15 projecting from axially opposite sides of the stator core 14. The stator 13 is fixedly mounted in a casing 12 and has an inner circumferential surface covered with a stator can 18 which is fixed at its axially opposite ends to end plates 16 of the casing 12. The stator can 18 is spaced radially outwardly from the rotor can 25 by a small gap.

When the windings of the stator 13 are energized, they generate revolving magnetic fields for rotating the rotor 11 with the shaft 10.

Cylindrical coil end stiffener tubes 17 are axially disposed between the end faces of the stator core 14 and the end plates 16 of the casing 12. The coil end stiffener tubes 17 have an inside diameter which is the same as the inside diameter of the stator core 14. The stator can 18 covers the coil end stiffener tubes 17 and the inner circumferential surface of the stator core 14. The stator can 18 serves to prevent a fluid handled by the pump from entering the stator 13.

The rotor 11 comprises of a rotor core 21 having many coil slot bars, end rings 24, and balance rings 23 at the both sides thereof. The circumferential surface of the rotor 11 is covered by rotor can 25 for preventing a fluid front entering the rotor 11.

When an alternating current is supplied to the windings of the stator 13, the rotor 11 and the shaft 10 rotate in unison with each other, and the pump impeller connected to the shaft 10 rotates to pump the fluid. At the same time, part of the fluid is introduced into the gap between the rotor 11 and the stator 13 which are covered with the respective rotor and stator cans 25, 18 for cooling the rotor 11 and the stator 13.

The rotor and stator cans 25, 18 are formed by cutting sheets of metal such as nickel alloy each having a thickness ranging from 0.2 to 1 mm to suitable lengths, rounding the cut sheets to cylindrical shape, and then welding the butted ends of the rounded sheets. When the rotor 11 is assembled, the rotor can 25 is fitted over the outer circumferential surface of the rotor core 21. Therefore, it is necessary that the inside diameter of the rotor can 25 be slightly greater than the outside diameter of the rotor core 21. Since it is generally difficult to establish the inside diameter of the rotor can 25 highly accurately, it has been customary to cut the sheet of nickel alloy to such a length that the inside diameter of the rotor can 25 will be slightly greater than the outside diameter of the rotor core 21, i.e., a gap will be created between the rotor can 25 and the rotor core 21, allowing the rotor can 25 to be easily be mounted on the rotor core 21.

However, when the rotor 11 is used under a high pressure while a gap is present between the rotor can 25 and the rotor core 21, the rotor can 25 is brought into intimate contact with the outer circumferential surface of the rotor core 21. As shown in FIG. 2 of the accompanying drawings, the rotor can 25 shrinks over the rotor core 21 and produces a radially outward wrinkle 26 which extends substantially the full length of the rotor can 25.

The radially outward wrinkle 26 on the rotor can 25 tends to cause a turbulence in the fluid in the gap between the rotor 11 and the stator 13, resulting in an energy loss and a reduction in the efficiency of the canned motor when it operates at a high speed. Furthermore, the radially outward wrinkle 26 may possibly be forced into contact with -the inner circumferential surface of the stator can 18, damaging the stator can 18.

SUMMARY OF THE INVENTION

It is therefore an object of the present invention to provide a canned motor which has a rotor covered with a cylindrical rotor can that is prevented from being wrinkled when the canned motor is rotated at a high speed of at least 10000 rpm, for example, under a high pressure, so that the canned motor can operate with safety.

According to the present invention, the above object can be accomplished by a canned motor comprising a rotor having a rotor core and a rotor can covering an outer circumferential surface of the rotor core, and a stator fixedly disposed around the rotor with a radial gap defined therebetween and having a stator core and a stator can covering an inner circumferential surface of the stator core, the rotor core having at least one groove defined in an outer circumferential surface thereof and extending longitudinally thereof, the rotor can having a portion pressed into the groove and held in intimate contact fully with the outer circumferential surface of the rotor core.

The rotor core may have two diametrically opposite grooves defined in an outer circumferential surface thereof and extending longitudinally thereof, the rotor can having two diametrically opposite portions pressed into the grooves, respectively, and held in intimate contact fully with the outer circumferential surface of the rotor core.

The groove or grooves may have a cross-sectional size selected to take up a difference between the circumferential length of the rotor can and the length of the outer circumferential surface of the rotor core.

The rotor can has an inside diameter slightly greater than the outside diameter of the rotor core such that the rotor core can easily be pressed into the rotor can. After the rotor core has been pressed into the rotor can, the portion of the rotor can is pressed radially into the groove in the outer circumferential surface of the rotor core for thereby holding the rotor can into intimate contact fully with the outer circumferential surface of the rotor core.

The rotor can thus neatly pressed against and fitted over the rotor core is prevented from being wrinkled radially outwardly even when the rotor is rotated at a high speed under a high pressure. Therefore, the rotor can be rotated smoothly in the stator without the danger of contacting and damaging the stator.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
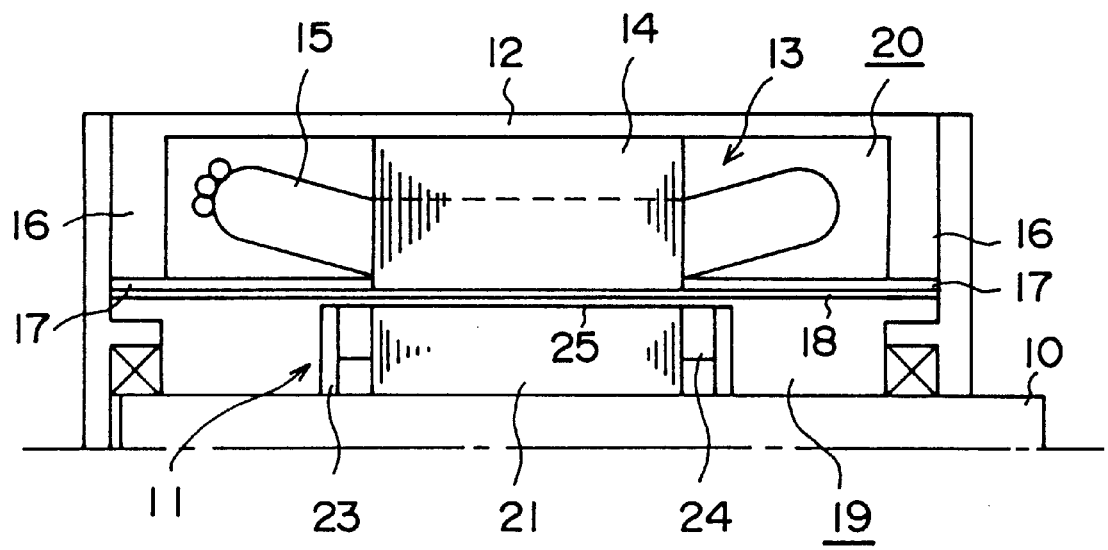
FIG. 1 is a fragmentary longitudinal cross-sectional view of a conventional canned motor.
Figure 2:
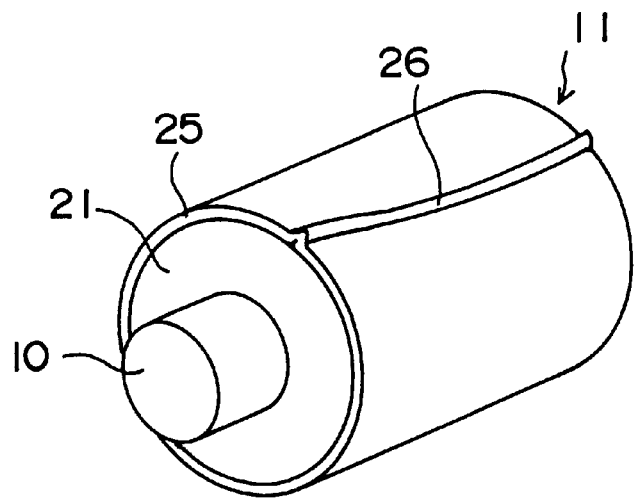
FIG. 2 is a perspective view of a rotor of the conventional canned motor shown in FIG. 1.
Figure 3:
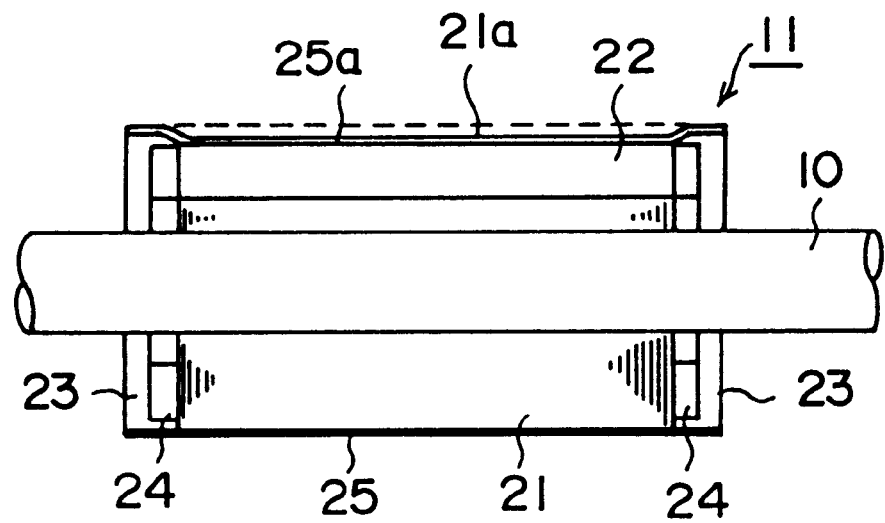
FIG. 3 is a longitudinal cross-sectional view of a rotor of a canned motor according to the present invention.
Figure 4:
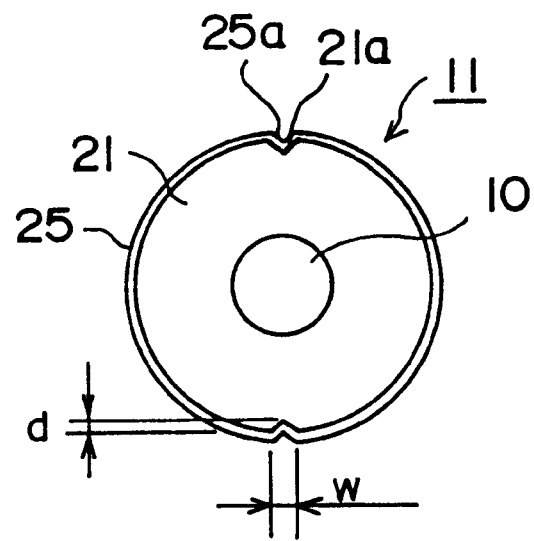
FIG. 4 is a transverse cross-sectional view of the rotor shown in FIG. 3.

FIGS. 3 and 4 show a rotor 11 of a canned motor according to the present invention. Other details of the canned motor according to the present invention are identical to those shown in FIGS. 1 and 2. The rotor 11 comprises a cylindrical rotor core 21 mounted on a shaft 10 and having a slot bar 22 embedded therein and extending axially substantially the full length thereof. The slot bar 22 has axially opposite ends joined to respective end rings 24 mounted on axially opposite ends of the rotor core 21. Two disk-shaped balance rings 23 are disposed respectively on the outer surfaces of the end rings 24. The rotor core 21 has an outer circumferential surface covered with a thin cylindrical rotor can 25 having axially opposite ends covering the respectively outer circumferential surfaces of the balance rings 23.

The rotor can 25 is formed by rounding a sheet of nickel alloy having a thickness ranging from 0.2 to 1 mm to cylindrical shape. Since the rotor can 25 needs to be fitted over the rotor core 21, the rotor can 25 has an inside diameter slightly greater than the outside diameter of the rotor core 21.

Specifically, the rotor can 25 is formed by cutting a sheet of nickel alloy to a suitable length, rounding the cut sheet to cylindrical shape, and then welding the butted ends of the rounded sheet. The length to which the sheet of nickel alloy is cut, is selected to be slightly greater than the outer circumference length of the rotor core 21.

The rotor 11 is assembled by inserting the rotor core 21 axially into the cylindrical rotor can 25. Since the inside diameter of the rotor can 25 is slightly greater than the outside diameter of the rotor core 21, the rotor core 21 can easily be inserted axially into the cylindrical rotor can 25.

As shown in FIG. 4, the rotor core 21 has two diametrically opposite grooves 21a defined in the outer circumferential surface thereof and extending axially the full longitudinal length thereof. The grooves 21a have a cross-sectional size selected such that they take up the difference between the length of the sheet of nickel alloy and the outer circumference of the rotor core 21. For example, each of the grooves 21a has a width "w" ranging from 1.5 to 2 mm and a depth "d" of about 1 mm.

After the rotor core 21 has been inserted axially into the cylindrical rotor can 25, a uniform hydraulic pressure is applied to the entire outer circumferential surface of the rotor can 25 to force the rotor can 25 against the outer circumferential surface of the rotor core 21. At this time, two diametrically opposite portions of the rotor can 25 are plastically deformed radially inwardly into the grooves 21a, forming pressed wedges 25a in the respective grooves 21a. Since the grooves 21a extend the full length of the rotor core 21, the uniform hydraulic pressure causes the wedges 25a to be pressed into the grooves 21a over substantially the entire length of the rotor core 21, as seen in FIG. 3. The entire inner circumferential surface of the rotor can 25 is thus held in intimate contact with the outer circumferential surface of the rotor core 21. The rotor 11 is now completed.

Since the rotor can 25 is pressed in intimate contact with the rotor core 21 with the pressed wedges 25a retained in the respective grooves 21a, the rotor can 25 is prevented from being wrinkled radially outwardly when the rotor 11 is rotated in a high pressure atmosphere within the stator (not shown in FIGS. 3 and 4).

As no wrinkles are developed on the outer circumferential surface of the rotor can 25, no turbulence is created in the fluid in the gap between the rotor 11 and the stator 13, and hence the rotor 11 can be rotated smoothly without causing an energy loss. The rotor 11 is also prevented from contacting the inner circumferential surface of the stator 13 disposed around the rotor 11, and hence from damaging the stator can that covers the stator.

The rotor core 21 may have one or three or more grooves 21a defined in the outer circumferential surface thereof. Each of the grooves 21a may have its corners rounded to prevent them from damaging the rotor can 25.

Although a certain preferred embodiment of the present invention has been shown and described in detail, it should be understood that various changes and modifications melts be made therein without departing from the scope of the appended claims.

What is claimed is:

1. A canned motor comprising:

a rotor having a rotor core and a rotor can covering an outer circumferential surface of said rotor core; and a stator fixedly disposed around said rotor with a radial gap defined therebetween, said stator having a stator core and a stator can covering an inner circumferential surface of said stator core;

wherein said rotor can covers said rotor core by:

rotor core having at least one groove defined in an outer circumferential surface thereof and extending longitudinally thereof, said groove having a width ranging from 1.5 to 2 mm and a depth of about 1 mm;

inserting said rotor core into the cylindrical rotor can which has a greater inside diameter than an outside diameter of said rotor core; and applying uniform hydraulic pressure to said rotor can having the rotor core inserted therein, a portion of the rotor can thereby being plastically deformed radially inwardly into said groove of said rotor core and the rotor can being formed intimate tight contact with the outer circumferential surface of said rotor core.

2. A canned motor according to claim 1, wherein said rotor core has two diametrically opposite grooves defined in the outer circumferential surface thereof and extending longitudinally thereof, and said rotor can has two diametrically opposite portions being pressed into said grooves, respectively.

3. A canned motor according to claim 1, wherein said groove of said rotor core is V-shaped.

4. A canned motor according to claim 1, wherein said rotor can is formed by:

cutting a sheet of metal;

rounding the cut sheet in a cylindrical shape; and welding butted ends of the rounded sheet.

\* \* \* \* \*

UNITED STATES PATENT AND TRADEMARK OFFICE
CERTIFICATE OF CORRECTION

PATENT NO. : 6,060,805

DATED : May 9, 2000

INVENTOR(S): Koichi OHTAKE, et al.

It is certified that an error appears in the above-identified patent and that said Letters Patent is hereby corrected as shown below:

On the title page item [45] should be:

--[45] Date of Patent: *May 9, 2000--

On the title page CPA information has been omitted. It should read:

--[*] Notice: This patent issued on a continued prosecution Application filed under 37 CFR 1.53(d), and is subject to the twenty year patent term provisions Of 35 U.S.C. 154(a)(2).--

Signed and Sealed this

Eighth Day of May, 2001

Attest:

NICHOLAS P. GODICI

Attesting Officer

Acting Director of the United States Patent and Trademark Office